(12) United States Patent
Grasso

(10) Patent No.: US 7,848,660 B1
(45) Date of Patent: Dec. 7, 2010

(54) VSB TRANSMITTER USING LOCKED FILTER

(75) Inventor: Giorgio Grasso, Monza (IT)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 12/399,576

(22) Filed: Mar. 6, 2009

Related U.S. Application Data

(63) Continuation of application No. 09/886,675, filed on Jun. 20, 2001, now abandoned.

(51) Int. Cl.
*H04B 10/00* (2006.01)
(52) U.S. Cl. .................. 398/196; 398/192
(58) Field of Classification Search .......... 398/182–201
See application file for complete search history.

(56) References Cited

U.S. PATENT DOCUMENTS

| | | | | |
|---|---|---|---|---|
| 3,676,799 A * | 7/1972 | Danielmeyer | .......... | 372/32 |
| 4,912,716 A * | 3/1990 | Mead | .......... | 372/32 |
| 5,007,705 A | 4/1991 | Morey et al. | | |
| 5,107,511 A * | 4/1992 | Nakatani et al. | .......... | 372/29.021 |
| 5,184,244 A * | 2/1993 | Nishimura et al. | .......... | 398/195 |
| 5,208,819 A * | 5/1993 | Huber | .......... | 372/32 |
| 5,387,992 A * | 2/1995 | Miyazaki et al. | .......... | 398/95 |
| 5,390,203 A * | 2/1995 | Miller | .......... | 372/29.02 |
| 5,663,822 A * | 9/1997 | Fee | .......... | 398/95 |
| 5,777,773 A * | 7/1998 | Epworth et al. | .......... | 398/185 |
| 5,828,689 A * | 10/1998 | Epworth | .......... | 372/98 |
| 6,028,879 A * | 2/2000 | Ershov | .......... | 372/57 |
| 6,081,539 A * | 6/2000 | Mattori et al. | .......... | 372/20 |
| 6,175,579 B1 * | 1/2001 | Sandford et al. | .......... | 372/32 |
| 6,201,638 B1 * | 3/2001 | Hall et al. | .......... | 359/346 |
| 6,282,215 B1 * | 8/2001 | Zorabedian et al. | .......... | 372/20 |
| 6,345,059 B1 * | 2/2002 | Flanders | .......... | 372/20 |
| 6,366,592 B1 * | 4/2002 | Flanders | .......... | 372/18 |
| 6,370,170 B1 * | 4/2002 | Glance | .......... | 372/32 |
| 6,396,603 B1 * | 5/2002 | Kim | .......... | 398/91 |
| 6,441,933 B1 * | 8/2002 | Jang | .......... | 398/79 |
| 6,567,436 B1 * | 5/2003 | Yao et al. | .......... | 372/32 |
| 6,600,760 B1 * | 7/2003 | Green et al. | .......... | 372/20 |
| 6,766,116 B2 * | 7/2004 | Webb | .......... | 398/196 |
| 6,970,655 B2 * | 11/2005 | Ono et al. | .......... | 398/186 |
| 7,406,107 B2 * | 7/2008 | Flanders et al. | .......... | 372/20 |
| 2002/0018505 A1 * | 2/2002 | Basting et al. | .......... | 372/55 |
| 2002/0075546 A1 * | 6/2002 | Webb | .......... | 359/180 |
| 2002/0076132 A1 * | 6/2002 | Peral et al. | .......... | 385/15 |
| 2002/0126345 A1 * | 9/2002 | Green et al. | .......... | 359/122 |
| 2002/0136104 A1 * | 9/2002 | Daiber | .......... | 369/44.23 |
| 2003/0058509 A1 * | 3/2003 | Webb et al. | .......... | 359/187 |
| 2003/0133650 A1 * | 7/2003 | Hakimi et al. | .......... | 385/27 |
| 2004/0208436 A1 * | 10/2004 | Hakimi et al. | .......... | 385/27 |
| 2004/0208643 A1 * | 10/2004 | Roberts et al. | .......... | 398/186 |

OTHER PUBLICATIONS

M. Sieben et al., 10GBbit/s Optical Single Sideband System, Electronics Letters, May 22, 1997, vol. 33, No. 11, pp. 971-973.
T. Wuth et al., Impact of Self-Phase Modulation on Bandwidth Efficient Modulation Formats, Optical Society of America 2000.

\* cited by examiner

*Primary Examiner*—Agustin Bello

(57) ABSTRACT

Systems and methods for generating spectrally efficient modulated optical signals are provided. Capacity of WDM optical communication links may be increased dramatically without changing the WDM channel plan thus minimizing modifications to optical amplifiers and passive optical components. A vestigial sideband (VSB) optical signal may be generated by filtering an amplitude modulated (AM) signal using a filter having a center frequency locked to the transmission frequency of a laser.

18 Claims, 3 Drawing Sheets

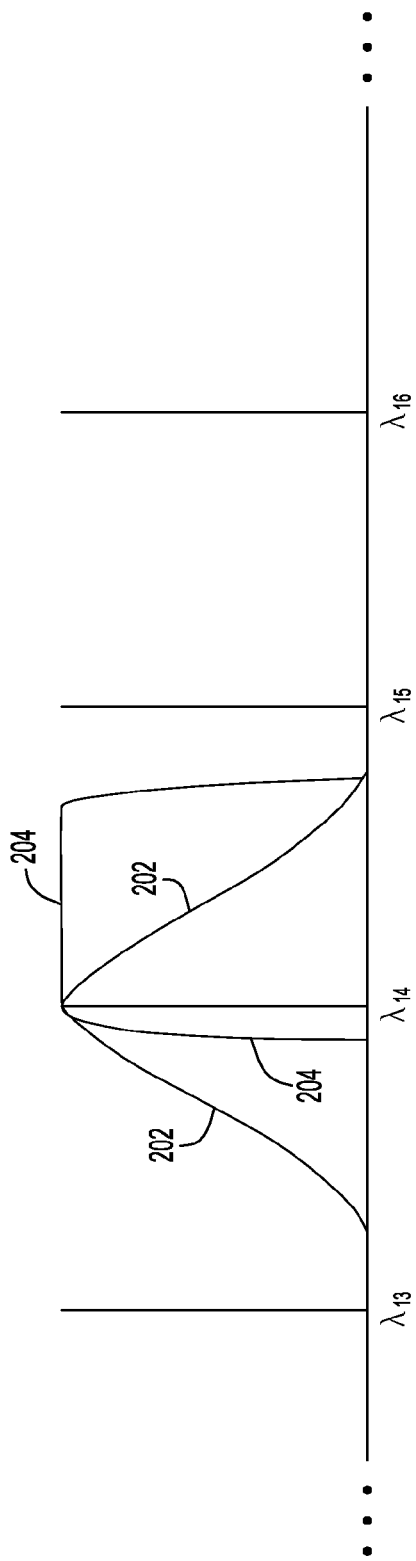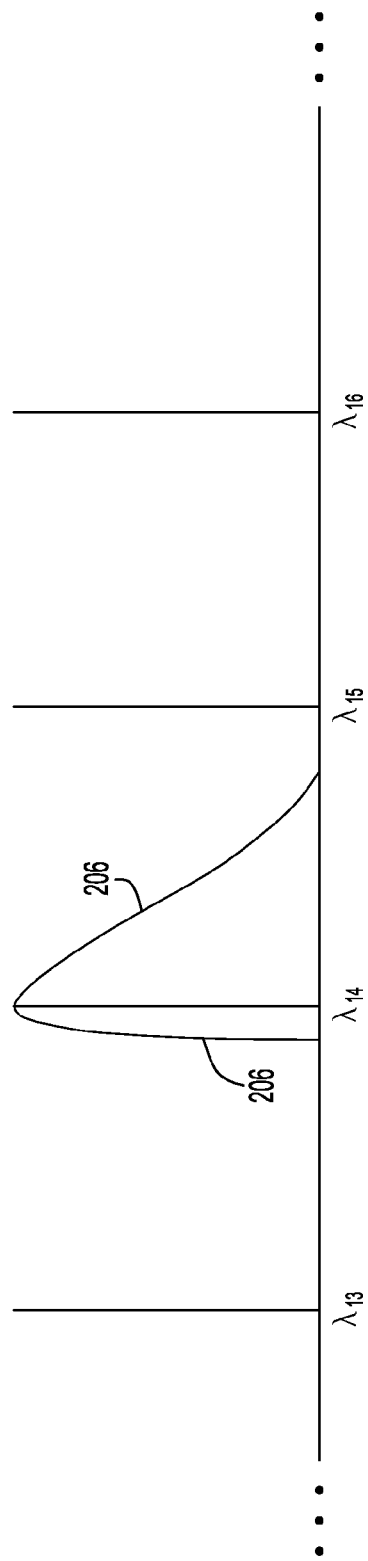
FIG.2A
FIG.2B

VSB TRANSMITTER USING LOCKED FILTER

This application is a continuation of U.S. patent application Ser. No. 09/886,675, filed on Jun. 20, 2001 now abandoned, the entirety of which is incorporated herein by reference.

BACKGROUND OF THE INVENTION

The present invention relates to optical communication systems and more particularly to systems and method for transmitting using optical filtering to shape the spectrum of a modulated optical signal.

With continuing increases in data traffic, it is desirable to increase the carrying capacity of optical communication links. One way of doing this is to add new fibers. Where optical fiber communication links already exist, they are supplemented with new fiber along the entire link. This however is extremely expensive due to the need to dig along the length of the link to install the new fiber, the need to install optical amplifiers along the new fiber, and the fact that the optical link may extend over hundreds or even thousands of kilometers.

Modern high capacity links typically already employ wavelength division multiplexing (WDM) techniques where a single fiber carries multiple optical signals having different wavelengths. In one representative configuration, there are multiple optical signals carrying 10 Gbps signals spaced 50 GHz apart in the frequency domain. The modulation employed is amplitude modulation (AM) so that each signal occupies 20 GHz of spectrum.

It would be desirable to increase the capacity of this link by, for example, a factor of 4. It would further be desirable to increase the link capacity without changing the WDM channel plan in order to minimize any modification of optical amplifiers or passive optical components along the link. A way of accomplishing this would be to increase the data rate carried by each optical signal to 40 Gbps while maintaining 50 GHz spacing. However, if amplitude modulation is used, each signal will occupy at least 80 GHz of spectrum causing spectral overlap of the modulated optical signals. Increasing the spacing to accommodate the wider modulated signals would reduce the number of WDM channels that can be accommodated, greatly reducing any capacity increase that would otherwise be achieved. Another problem with the increased data rate is that chromatic dispersion is increased due to the broadened spectrum of each signal while the tolerance to chromatic dispersion effects is reduced due to the narrowing of the pulse widths of the modulated signals.

An alternative to amplitude modulation is the use of vestigial sideband (VSB) or single sideband (SSB) techniques where one of the two sidebands introduced by amplitude modulation is suppressed (VSB) or entirely attenuated (SSB). In SSB, the carrier is also attenuated. These techniques are more spectrally efficient than AM. Furthermore, they allow data rate to be increased with less impact from chromatic dispersion effects. Proposed optical VSB and SSB optical transmitters involve the use of extremely complex and expensive modulators that synthesize the suppressed sideband signals. Besides complexity and expense, another drawback is that optical amplification would be required to compensate for the insertion loss introduced by these modulators.

What is needed are more easily implemented systems and methods for generating suppressed sideband optical signals.

SUMMARY OF THE INVENTION

Systems and methods for generating spectrally efficient modulated optical signals are provided by virtue of one embodiment of the present invention. Capacity of WDM optical communication links may be increased dramatically without changing the WDM channel plan thus minimizing modifications to optical amplifiers and passive optical components. In one embodiment, a vestigial sideband (VSB) optical signal is generated by filtering an amplitude modulated (AM) signal using a filter having a center frequency locked to the transmission frequency of a laser.

According to a first aspect of the present invention, an optical transmitter includes: a coherent light source, a frequency control loop that measures and controls a transmission frequency of the coherent light source, and an optical filter having a controllable center frequency that filters a modulated signal derived from the coherent light source. The wavelength control loop tunes the controllable center frequency to be a fixed spacing away from the transmission frequency.

According to a second aspect of the present invention, a WDM optical transmission system includes a plurality of optical transmitters. Each of the optical transmitters includes a coherent light source, a frequency control loop that measures and controls a transmission frequency of the coherent light source, and an optical filter having a controllable center frequency that filters a modulated signal derived from the coherent light source. The wavelength control loop tunes the controllable center frequency to be a fixed spacing away from the transmission frequency.

Further understanding of the nature and advantages of the inventions herein may be realized by reference to the remaining portions of the specification and the attached drawings.

BRIEF DESCRIPTION OF THE DRAWINGS

FIGS. 2A-2B depict elements of a WDM signal in the frequency domain according to one embodiment of the present invention.

DESCRIPTION OF SPECIFIC EMBODIMENTS

The present invention is generally directed toward an optical transmitter that generates an amplitude modulated signal with suppressed sidebands. The discussion below will primarily refer to generation of a vestigial sideband (VSB) signal but it will be appreciated that the present invention also applies to other signals such as single sideband (SSB) signals.

One application of the present invention is a WDM optical communication system where multiple signals having different wavelengths occupy the same fiber. According to the present invention, filtering to attenuate one of the sidebands of an amplitude modulated optical signal reduces the spectrum occupied by the signal. This allows the data rate of a WDM optical communication link to be increased by increasing the data rate of the individual optical signals. In many situations, the filtering technique provided by the present invention allows this to be accomplished without changing the spacing between WDM channels. Thus, the capacity increase provided by increased data rate is not lost due to a reduced number of WDM channels. Furthermore, the narrower spectrum occupied by the VSB signal results in less impairment due to chromatic dispersion than would result from amplitude modulation.

Figure 1:
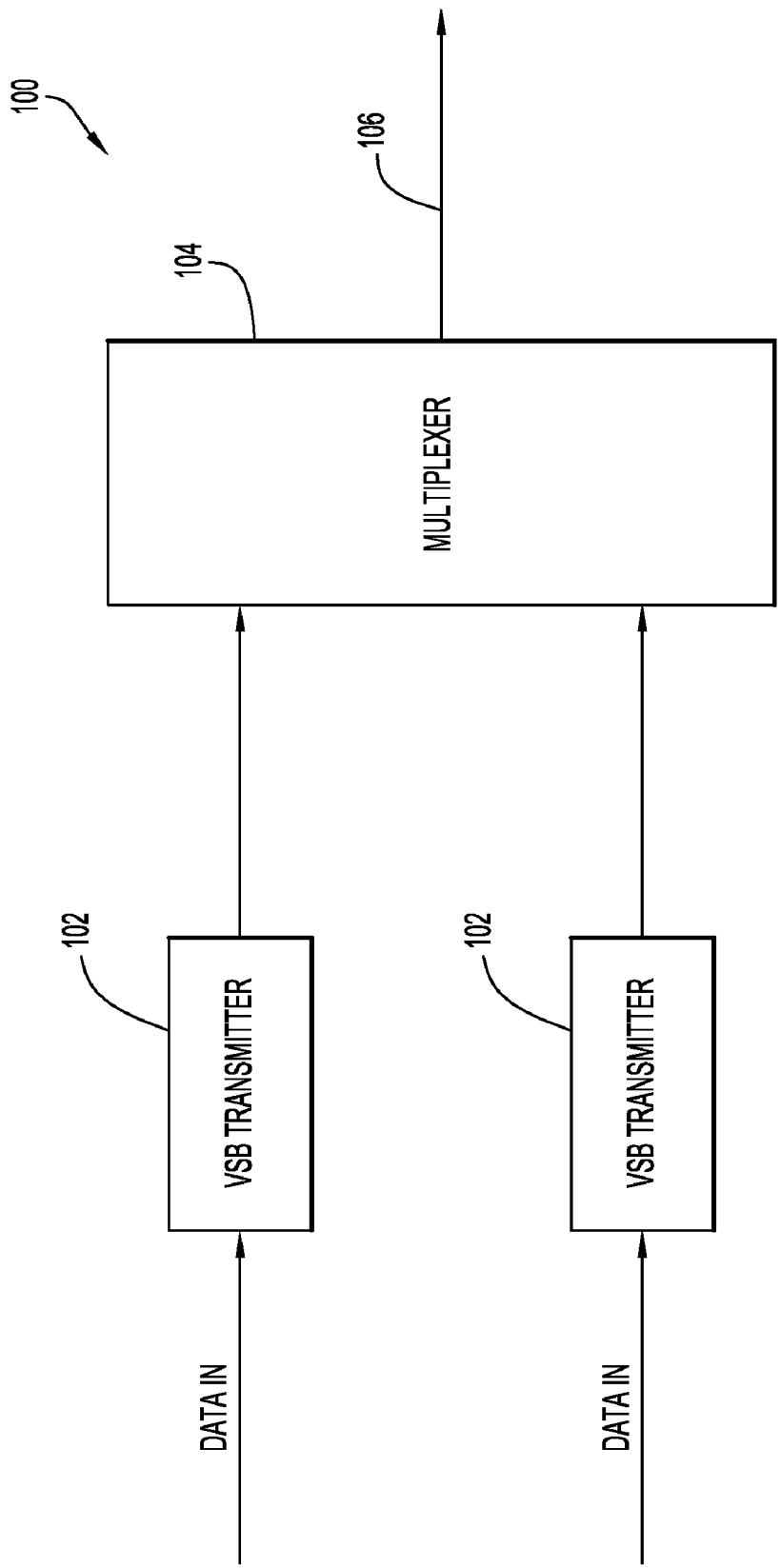
FIG. 1 depicts a WDM transmission system employing VSB modulation according to one embodiment of the present invention.

FIG. 1 depicts a WDM transmission system 100 employing VSB modulation according to one embodiment of the present invention. WDM transmission system 100 includes multiple VSB transmitters 102. Each of VSB transmitters 102 receives a digital data stream or an analog signal that has been developed to encode the digital data stream. In one embodiment, each of the inputs to VSB transmitters 102 carries information at a 40 Gbps rate. Each of VSB transmitters 102 outputs a modulated optical signal on a wavelength or frequency assigned according to a WDM channel plan. According to the present invention, the modulation scheme may be, e.g., VSB, where a sideband of an amplitude modulated optical signal is suppressed. The optical outputs of VSB transmitters 102 are optically coupled to an optical multiplexer 104 as is known in the art. Multiplexer 104 combines the multiple optical signals carrying disparate wavelengths onto a common output fiber 106.

FIGS. 2A-2B depict elements of a WDM signal in the frequency domain according to one embodiment of the present invention. The frequencies of 4 particular WDM channels $\lambda_{13}$, $\lambda_{14}$, $\lambda_{15}$, and $\lambda_{16}$ are shown as well as details of modulation on the signal occupying channel $\lambda_{14}$. In a representative embodiment, the WDM channels are spaced 50 GHz apart.

In FIG. 2A, a spectral contour 202 represents the spectrum of an optical signal at $\lambda_{14}$ that is amplitude modulated with data. In a representative embodiment, the data rate is 40 Gbps and the amplitude-modulated spectrum extends 40 GHz in both directions from the center at $\lambda_{14}$. If this data rate were to be used at each WDM channel, the use of amplitude modulation would cause the various signals to overlap in the frequency domain. Even if the data rate were to be reduced to e.g., 20 Gbps, to eliminate overlap when transmitters 102 transmit on their exact assigned frequencies, one must still consider that overlap may well result from transmitter frequency drift over time.

To permit the use of data rates that are high relative to the WDM channel spacing, the present invention provides for filtering of the amplitude modulated optical signal on each WDM channel. A filter response 204 is depicted as an example of the type of filtering used to limit the spectrum of the amplitude modulated optical signal. In this example, the upper sideband and carrier are within the passband of the filter response whereas a large portion of the lower sideband is in the stopband of the filter response. A portion of the lower sideband in proximity to the carrier is within a transition between the passband and the stopband.

In one embodiment, the bandwidth of the filter response is between 0.4 and 0.7 times a bandwidth equivalent to the bit rate of the modulation data. The center frequency of the filter can then be between 0.2 and 0.35 times this bit rate equivalent bandwidth.

FIG. 2B depicts a contour 206 that represents the spectrum of the VSB signal resulting from the application of filter response 204. It can be seen that the upper sideband and carrier are preserved while the lower sideband is greatly attenuated. It will be appreciated that using a similar filter structure, one could preserve the lower sideband and carrier while greatly attenuating the upper sideband.

Figure 3:
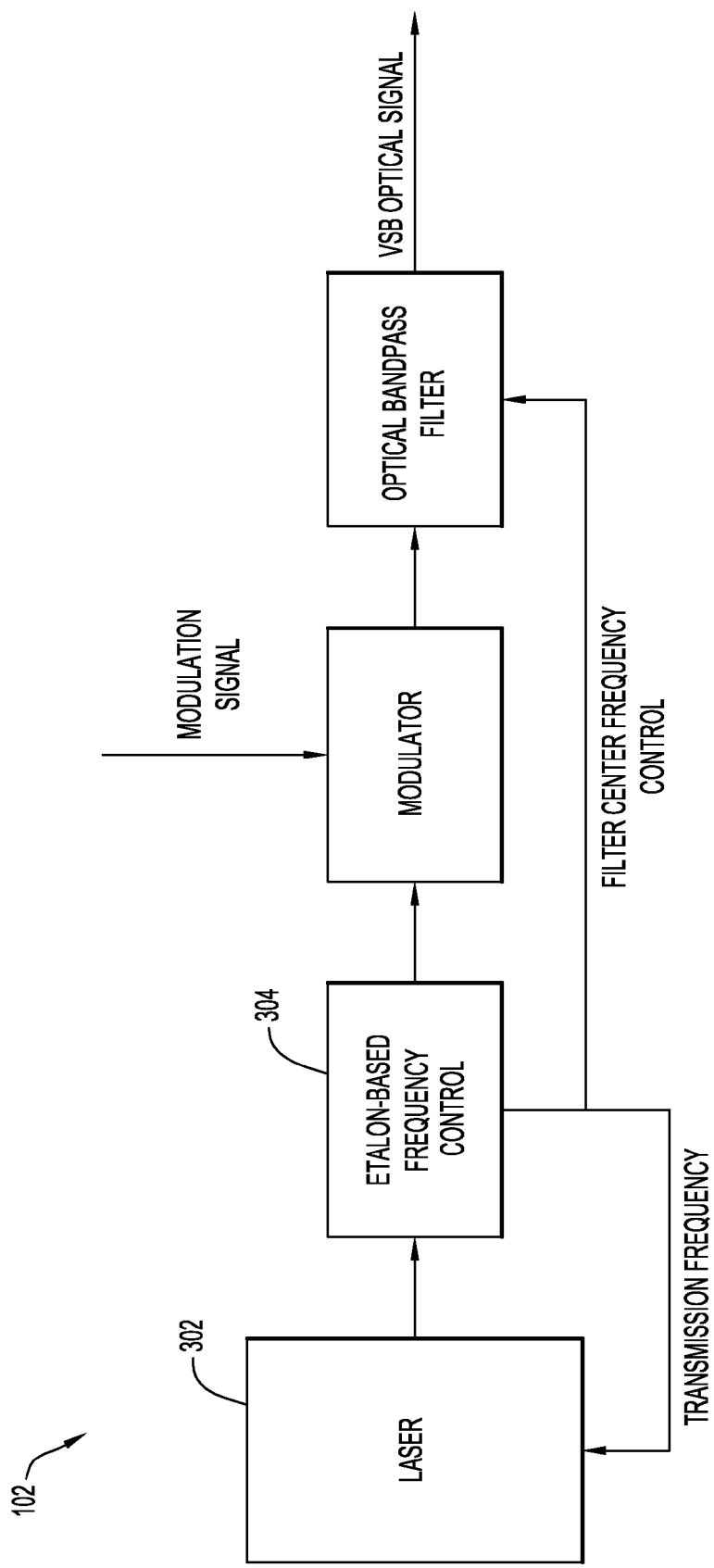
FIG. 3 depicts a VSB optical transmitter according to one embodiment of the present invention.

FIG. 3 depicts VSB optical transmitter 102 according to one embodiment of the present invention. A laser 302 emits a continuous wave (CW) optical signal. Laser 302 may be a distributed feedback (DFB) laser. An etalon frequency control device 304 as known in the art receives the optical energy generated by laser 302 and generates an electrical control signal to lock the transmission frequency of laser 302 to a desired value. The optical output of frequency control device 304 is coupled to a modulator 306. Modulator 306 may be a LiNb device and amplitude modulates the frequency-locked CW signal in accordance with a modulation signal. This modulation signal may be, e.g., an analog signal encoded with digital data according to either an RZ (return to zero) or NRZ (non-return to zero) scheme.

The output of modulator 306 is coupled to the input of an optical bandpass filter 308. The response of optical bandpass filter 308 substantially corresponds to filter response 204 from FIG. 2A (or an equivalent response that attenuates the upper sideband rather than the lower sideband). Optical bandpass filter 308 also has an electrically controllable center frequency.

According to one embodiment of the present invention, the control signal for the center frequency is derived from the output of frequency control block 304 so that the center frequency of optical bandpass filter 308 is locked to the transmission frequency of laser 302 plus a predetermined spacing. In one embodiment, this spacing is between 0.2 and 0.35 times the bandwidth equivalent of the data rate. In this way, the response of filter 308 will not drift so as to either attenuate desired portions of the upper sideband or pass undesired portions of the lower sideband. Circuitry to convert the control signal used for laser 302 to a control signal for optical bandpass filter 308 may be implemented in any suitable way.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, a similar structure used in conjunction with a suitable filter may be used to attenuate the carrier as well, to develop a SSB modulated optical signal.

The invention claimed is:

1. An optical transmitter comprising:
a coherent light source that is configured to output continuous wave optical energy;
a frequency control loop that measures and controls a transmission frequency of said coherent light source, the frequency control loop comprising an etalon frequency control device that is configured to receive the continuous wave optical energy output by the coherent light source and to generate an electrical control signal to lock the transmission frequency of the continuous wave optical energy to a desired value;
a modulator that is configured to be coupled to the output of the etalon frequency control device and is configured to amplitude modulate the continuous wave optical energy with a modulation signal to output a modulated optical signal;
an optical filter having a controllable center frequency that is configured to filter the modulated optical signal output by the modulator to output a filtered modulated optical signal having a first sideband substantially attenuated a second sideband substantially unattenuated; and
wherein said etalon frequency control device is configured to generate the electrical control signal that controls the coherent light source so that said controllable center frequency is locked to said transmission frequency plus a predetermined spacing such that a response of the optical filter does not drift causing either attenuation of desired portions of the second sideband or passing of undesired portions of the first sideband.

2. The optical transmitter of claim 1 wherein said optical filter is configured to output the filtered modulated optical signal which is a vestigal sideband signal.

3. The optical transmitter of claim 1:
a wherein the modulator is configured to amplitude modulate the continuous wave optical energy output of said coherent light source to transmit digital information.

4. The optical transmitter of claim 3 wherein said optical filter is configured to have a bandwidth of between 0.4 and 0.7 times a bit rate equivalent bandwidth of digital information.

5. The optical transmitter of claim 3 wherein the etalon frequency control device is configured to generate the electrical control signal for the transmission frequency of the coherent light source so that the predetermined spacing is between 0.2 and 0.35 times a bit rate equivalent bandwidth of said digital information.

6. A wavelength division multiplexed (WDM) optical transmission system comprising:
a plurality of optical transmitters, each of said optical transmitters comprising:
    a coherent light source that is configured to output continuous wave optical energy;
    a frequency control loop that measures and controls a transmission frequency of said coherent light source, the frequency control loop comprising an etalon frequency control device that is configured to receive the continuous wave optical energy output by the coherent light source and to generate an electrical control signal to lock the transmission frequency of the continuous wave optical energy output by the coherent light source to a desired value;
    a modulator that is configured to be coupled to the output of the etalon frequency control device and is configured to amplitude modulate the continuous wave optical energy with a modulation signal to output a modulated optical signal;
    an optical filter having a controllable center frequency that is configured to filter the modulated optical signal output by the modulator to output a filtered modulated optical signal having a first sideband substantially attenuated a second sideband substantially unattenuated; and
    wherein said etalon frequency control device is configured to generate the electrical control signal that controls the coherent light source so that said controllable center frequency is locked to said transmission frequency plus a predetermined spacing such that a response of the optical filter does not drift causing either attenuation of desired portions of the second sideband or passing of undesired portions of the first sideband;
wherein the etalon frequency control device in each optical transmitter is configured to control the transmission frequency of its associated coherent light source to a different transmission frequency for a WDM channel that forms a part of a WDM plan.

7. The WDM optical transmission system of claim 6:
wherein the modulator that is configured to amplitude modulate the continuous wave optical signal output of said coherent light source to transmit digital information.

8. The WDM optical transmission system of claim 7 wherein, within each of said plurality of optical transmitters, the optical filter is configured to have a bandwidth between 0.4 and 0.7 times a bit rate equivalent bandwidth of said digital information modulated by the modulator in the associated optical transmitter.

9. The WDM optical transmission system of claim 7 wherein, within each of said plurality of optical transmitters, the etalon frequency control device is configured to generate the electrical control signal for the transmission frequency of the coherent light source so that the predetermined spacing is between 0.2 and 0.35 times a bit rate equivalent bandwidth of said digital information modulated by the modulator in the associated optical transmitter.

10. The WDM optical transmission system of claim 7 wherein the etalon frequency control devices in the plurality of optical transmitters are coordinated such that said transmission frequencies of said coherent light sources of said optical transmitters are spaced more closely than twice a bit rate equivalent bandwidth of said digital information.

11. A method for transmitting an optical signal comprising:
generating a coherent light signal;
measuring a transmission frequency of said coherent light signal with an etalon device and generating an electrical control signal in order to lock said transmission frequency to a desired value;
amplitude modulating the coherent light signal with a modulation signal to output a modulated optical signal;
bandpass filtering the modulated signal to output a filtered modulated optical signal having a first sideband substantially attenuated a second sideband substantially unattenuated; and
generating said electrical control signal to control the transmission frequency of the coherent light signal so that a center frequency of said bandpass filtering is locked to the transmission frequency plus a predetermined spacing such that said bandpass filtering does not drift causing either attenuation of desired portions of the second sideband or passing of undesired portions of the first sideband.

12. The method of claim 11:
wherein modulating comprises modulating said coherent light signal with the modulation signal so that a signal developed by said bandpass filtering comprises a vestigal sideband modulated signal carrying digital information.

13. The method of claim 12 wherein bandpass filtering comprises bandpass filtering using a bandwidth of between 0.4 and 0.7 times a bit rate equivalent bandwidth of said digital information.

14. The method of claim 12 wherein generating the electrical control signal comprises generating the electrical control signal for the transmission frequency of the coherent light signal so that the predetermined spacing is between 0.2 and 0.35 times a bit rate equivalent bandwidth of said digital information.

15. An apparatus comprising:
means for generating a coherent light signal;
means for measuring a transmission frequency of said coherent light signal and for locking said transmission frequency to a desired transmission frequency, comprising an etalon device configured to generate an electrical control signal that controls said means for generating to lock the transmission frequency to a desired value;
means for amplitude modulating said coherent light signal to produce a modulated optical signal;

means for bandpass filtering a the modulated optical signal based on a controllable center frequency to output a filtered modulated optical signal having a first sideband substantially attenuated a second sideband substantially unattenuated; and wherein said etalon device is configured to generate the electrical control signal that controls the means for generating so that said controllable center frequency is locked to said transmission frequency plus a predetermined spacing such that a response of the optical filter does not drift causing either attenuation of desired portions of the second sideband or passing of undesired portions of the first sideband.

16. The apparatus of claim 15:
wherein the means for modulating is configured to modulate the coherent light signal with the modulation signal which carries digital information.

17. The apparatus of claim 16 wherein said means for bandpass filtering uses a bandwidth of between 0.4 and 0.7 times a bit rate equivalent bandwidth of said digital information.

18. The apparatus of claim 16 wherein said etalon device is configured to generate the electrical control signal for the transmission frequency of the means for generating so that the predetermined spacing is between 0.2 and 0.35 times a bit rate equivalent bandwidth of said digital information.

* * * * *